June 13, 1950  G. W. WALTON  2,511,520
AXIALLY ENGAGING AIR OPERATED CLUTCH
Filed Dec. 26, 1946  3 Sheets-Sheet 2

INVENTOR.
George W. Walton
BY Ashley & Ashley
ATTORNEYS

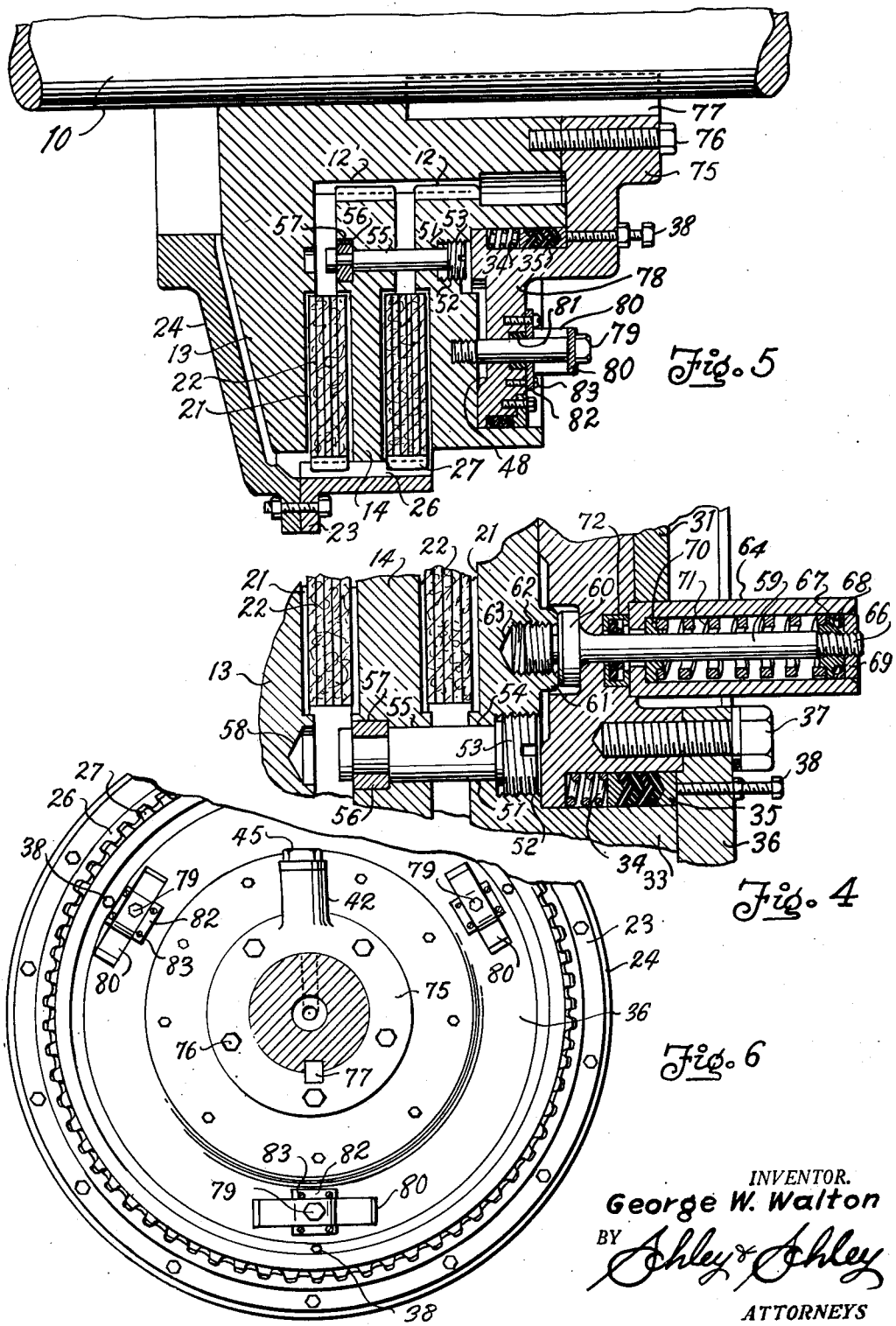

Patented June 13, 1950

2,511,520

UNITED STATES PATENT OFFICE 2,511,520

AXIALLY ENGAGING AIR OPERATED CLUTCH

George W. Walton, Dallas, Tex.

Application December 26, 1946, Serial No. 718,348

3 Claims. (Cl. 192—85)

This invention relates to new and useful improvements in fluid clutches.

One object of the invention is to provide an improved fluid clutch of the type having positively driven clutch members and floating clutch plates between the members, adapted to be frictionally engaged by the members for rotating the clutch housing, wherein the various elements are simplified and made more accessible.

Another object of the invention is to provide an improved fluid clutch having geared clutching elements adapted to frictionally engage in response to a fluid actuated element and releasing means for positively disengaging the clutch elements and retracting the fluid actuated element; a portion of which releasing means may be exposed for accessibility.

A further object of the invention is to provide a novel clutch releasing or retracting means for a clutch of the character described which will be efficient and rapid in operation.

A construction designed to carry out the invention will be hereinafter described together with other features of the invention.

Figure 1:
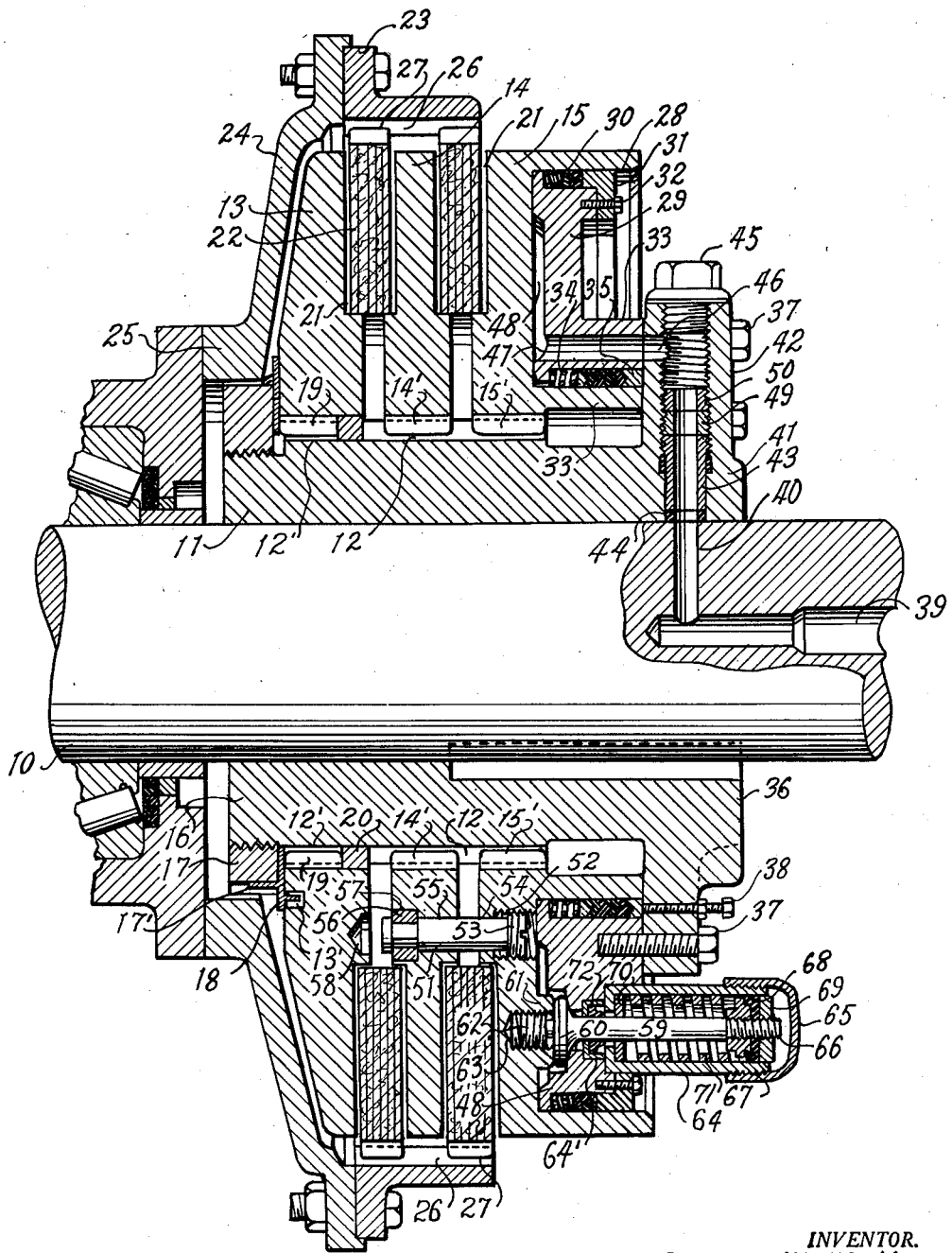
Figure 2:
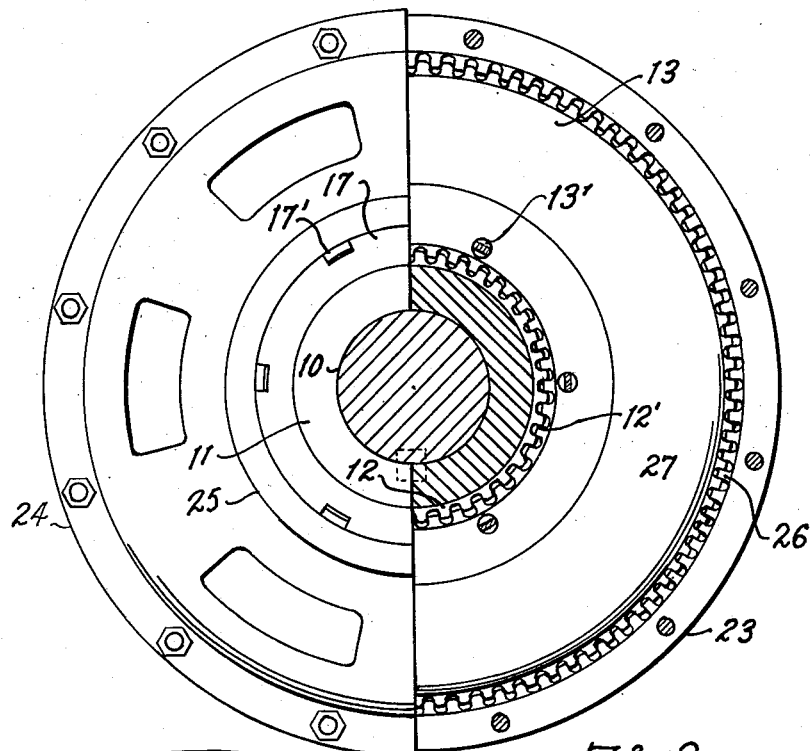
Figure 3:
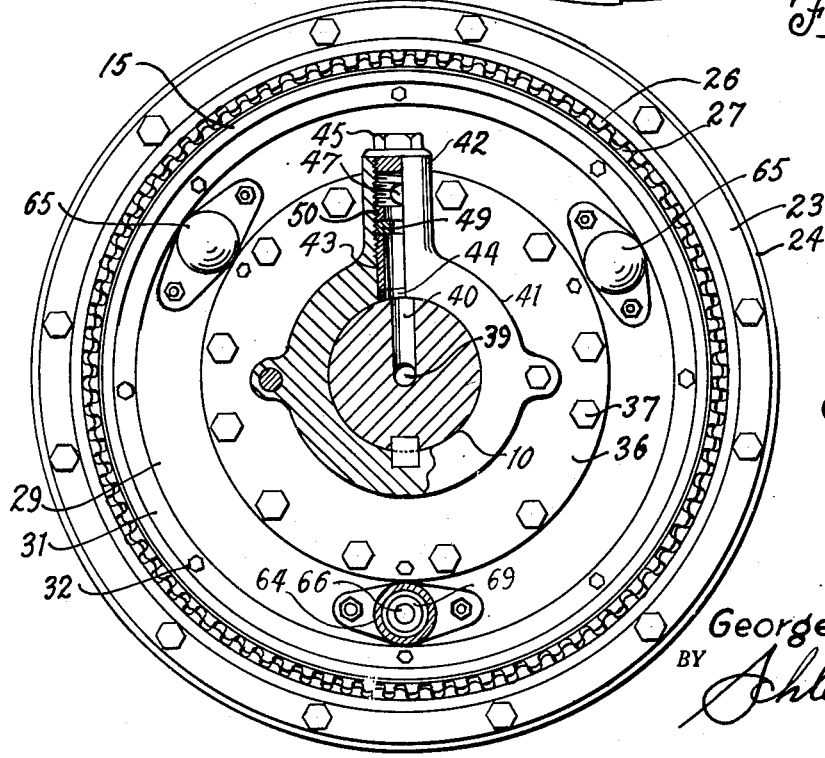

The invention will be more readily understood from a reading of the following specification and by reference to the accompanying drawings, wherein an example of the invention is shown and wherein:

Fig. 1 is a diametrical, sectional view of a fluid clutch constructed in accordance with the invention, Fig. 2 is a view of one end of the clutch, partly in elevation and partly in section, Fig. 3 is a similar view of the opposite end of the clutch, Fig. 4 is an enlarged longitudinal, sectional view of the clutch releasing means, Fig. 5 is a longitudinal, sectional view of a modified form of clutch releasing means, and Fig. 6 is a partial end elevation of the same.

In the drawings, the numeral 10 designates a drive shaft which has a clutch hub 11 keyed thereon. The hub has external elongate teeth 12 extending longitudinally thereof intermediate its ends. Mounted around the hub 11 are an annular clutch head 13, an annular spacer disk 14 and an annular pressure head 15; the disk 14 and head 15 being movable longitudinally of said hub.

One end of the hub is reduced as shown at 16 and externally screw-threaded to receive a retaining ring 17. An annular flat gasket 18 is confined upon the hub between the ring 17 and the clutch head and may be locked to said hub and head as shown at 13' and 17'. The bore of the clutch head is formed with radial teeth 19 which intermesh with the end portions 12' of the hub teeth 12 said teeth being intersected by a stop ring 20 seated in the hub and fitting in the bore of the head, at the inner end thereof, whereby said head is confined between the rings 17 and 20 against movement relative to said hub. The disk 14 and head 15 also have internal teeth 14' and 15' meshing with the teeth 12 so as to be rotatable with the hub.

The adjacent surfaces of the head 13, disk 14 and head 15 have their external peripheral portions recessed to provide annular recesses 21 and flat, annular friction clutch plates 22 float in these recesses. Each plate 22 is preferably laminated, being formed of layers of fibrous or non-metallic material commonly used for this purpose. An annular clutch ring 23 surrounds the clutch plates and is countersunk in the inner face of a clutch housing 24 which has an integral collar 25, at its center, loosely surrounding the ring 17. The clutch ring 23 has elongate, inner teeth 26 which mesh with teeth 27 formed on the external peripheries of the clutch plates.

When fluid pressure is applied to the head 15, the clutch plates will be frictionally gripped between the elements 13, 14 and 15 and, if rotation is imparted to the shaft 10, said plates are rotated and such rotation is transmitted to the clutch housing 24 by the teeth 26 and 27. Since the intermeshing teeth 12, 14', 15' and 19 and the intermeshing teeth 26 and 27 have sliding engagement, the disk and head may move longitudinally of the hub 11, and thus, when pressure is relieved on the head, the clutch plates will be released and the shaft and elements attached thereto may continue to rotate without rotating the housing 24 and ring 23 or said plates.

The head 15 has an annular chamber 28 in its outer side which receives a stationary annular member or piston 29. Spring-pressed packing rings 30 are confined in the external periphery of the abutment 29 by a cap ring 31 secured by machine screws 32, whereby a fluid seal is provided. The head has a cylindrical hub 33, forming the inner annular wall of the chamber 28. Spring-pressed pressure-sealing packing rings 34 are seated in the bore of the piston and snugly surround the hub 33. A follower ring 35 bears against the packing rings 34, so that while the hub may slide, a fluid-tight seal is provided.

A circular closure plate 36, preferably made integral with the hub 11, is secured to the piston 29 by machine bolts 37. Adjusting screws 38 mounted in the plate 36 engage the follower ring 35 for the purpose of compressing the rings 34. The shaft 10 is provided with an axial passage 39 connected with a suitable source of pressure fluid supply (not shown), such as compressed air, and a lateral port 40 extends through said shaft from the passage to the surface of said shaft.

The closure plate is formed with an annular, reduced boss 41 having a tubular valve case 42 extending radially therefrom and preferably made integral therewith. The bore of the case 42 is co-axially alined with the port 40. The inner end portion of the case bore is reduced and a bushing 43 has a snug sliding fit therein so as to compress a packing ring 44 between its lower end and the surface of the shaft. The major portion of the bore of the case is screw-threaded to the upper end thereof which is closed by a cap screw 45. Below the cap screw, a lateral port 46 extends from the bore of the case and registers with a lateral duct 47 in the abutment 29. The duct 47 communicates with an annular channel 48 formed in the inner side of the head.

For controlling and metering the flow of fluid to the channel 48, an orifice disk 49 rests upon the upper end of the bushing 43 and is confined by an externally screw-threaded, annular nut or retaining ring threaded in the bore of the case 42. The nut 50 not only holds the disk 49 in place but forces the bushing downwardly, whereby the packing ring 44 is compressed. It is obvious that the contacting faces of the hub 33 and the closure plate 36 should be finished to provide a fluid-tight contact therebetween.

In order to retract the disk 14 and head 15, the elements are loosely connected by a plurality of headed pins 51, only one being shown in Fig. 1. The head of the pin 51 is confined in a recess 52 in the piston head by a screw-threaded plug 53 and said pin extends loosely through alined bores 54 and 55 in said piston head and disk, respectively. A split ring 56, confined on the end of the pin, engages in a counter-bore 57 in the disk. The clutch head 13 has a sump 58 for receiving the end of the pin. When the piston head 15 is retracted, the disk is likewise retracted by the pin 51. It will be noted that while the disk 14 is loose on the pin 55, the pin is rigid in the head 15 and the ring 56 limits the movement or spacing of the disk from the head when the head is retracted; also that when said head is retracted, the pin and ring pull the disk back to a uniform spacing from said head and substantially to the same position. Further, it will be observed that the pins 55 are located inwardly of the clutch plates, thus utilizing the portions of the head and disk intermediate the hub and the clutch plates and thereby making it possible to form the teeth 27 directly on the peripheries of the plates and to keep the overall diameter of each plate within a desirable minimum.

As a means for retracting the head, a plurality of spring-pressed plungers 59 are provided (Figs. 1 and 4) and each plunger has a head 60 which bears against a boss 61 formed on the outer side of the head. A screw-threaded, axial stud 62, extending from the head 60, is threaded into a sump 63 in the boss 61. The stem of the plunger 59 extends outwardly through a counterbored opening 64' in the piston 29 into a cylindrical case 64 suitably secured to the outer surface of said abutment (Fig. 3) and having a cap 65 threaded onto its outer end. The outer end of the plunger is formed with a reduced screw-threaded pin 66. A flanged collar 67 is screwed onto this pin 66 against the shouldered end of the plunger and a flexible packing ring 68 is confined on the collar by a nut 69 threaded onto said pin. The periphery of the packing ring 69 has a pressure-sealing contact with the inner surface of the case. A flat washer 70 is seated within the case against the flanged inner end thereof and a coiled spring 71 is confined between the washer and the collar 67 so as to urge the plunger outwardly. A packing gland 72, in the counterbore 64', packs off around the stem of the plunger.

When the clutch is first operated, the pressure fluid entering the channel 48 also enters the case 64 through the counterbore 64' and the packing gland 72, which latter is arranged to trap such fluid in said case. This trapped fluid is confined in the case by the packing ring 68. When the head is moved to compress the plates 22, the coiled spring 71 is compressed as well as the pressure fluid (compressed air). Thus, when the supply of pressure fluid to the channel 48 is cut off, both the compressed spring 71 and the compressed air trapped in the case 64 act to retract the head 15 which, through its pins 51, retracts the disk 14. If desired, the outer end of the case 64 may be open whereby the packing ring 68 forms the sole closure for said case as shown in Fig. 4.

In operating the clutch, pressure fluid, such as compressed air, is suitably supplied to the passage 39 from which it flows by way of the port 40, bushing 43, orifice disk 49, bore of case 42, port 46 and duct 47 to the annular channel 48. This compressed air fills the channel and also enters the case 64. The pressure fluid acting against the outer side of the head 15 moves the same toward the disk 14 which, in turn, is moved toward the clutch head 13, whereby the clutch plates 22 are engaged and compressed.

When rotation is imparted to the shaft 10, the hub 11 is rotated and through its teeth 12 and 12' rotates the clutch head, disk and head. At the same time, the abutment 29 and closure plate 36 are rotated. Since the clutch plates 22 are free and floating, rotation is not transmitted to the ring 23 or the housing 24, but when said plates are engaged, as above described, rotation to transmit to the ring 23 by the teeth 26 and 27 and thus, to the housing.

When the supply of pressure fluid is shut off and the pressure in the channel 48 reduced, the spring 71, which has been compressed, expands and moves the plunger 59 outwardly in the case 64. Such compressed air, as has been trapped in the case 64, also expands and aids the spring in moving the plunger. The movement of the plunger retracts the head 15 and, at the same time, the pin 51 retracts the disk 14, thus freeing the clutch plates 22. Since the ring 56 may slide to the left (Fig. 1), it will not interfere with the compression of the clutch plates.

In Figs. 5 and 6 a modified form of structure is shown. Instead of forming the closure plate 36 integral the hub 11 and separate from the piston 29, a circular closure plate 75 is secured around shaft 10 to the end of the hub, by means of screw bolts 76. The hub and closure plate are secured to the shaft 10 by a key 77. The piston 78, which is substantially the same in structure as the piston 29, is made integral with the closure plate. The advantage of this construction is that by removing the bolts 76, the plate 75 and the piston may be withdrawn to expose the head of the pin 51 and the interior of the piston head 15 and to give access to the abutment.

The releasing or retracting means is partially changed. Headed studs 79, extending through the piston 78 and the channel 48, are screwed into the piston head. Bow springs 80, confined under the bolt heads, have their ends curved outwardly and bearing against the outer face of the piston 78, whereby the head 15 is retracted, when the fluid pressure is relieved to disengage the clutch. Packing glands 81 in the abutment, surround the bolts 79 and are covered by plates 82 secured to the piston by screws 83. This arrangement provides a simple retracting means. In withdrawing the closure plate 75 and piston 78, it would be necessary to remove the bolts 79 and springs 80.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A fluid clutch including, an axial shaft, a hub secured on said shaft, an annular piston secured around one end of the hub, an annular pressure head surrounding the hub having an annular chamber receiving the piston and movable longitudinally, a clutch head surrounding and connected to the hub, floating annular clutch plates surrounding the hub between the pressure head and the clutch head, a disk surrounding the hub between the plates and connected to the hub, the head and disk having alined bores inwardly of the plates, a pin extending through the bores of the head and disk and having a head fixed in the pressure head, whereby the pin is rigidly held in said pressure head, the disk having a counterbore, a split ring on the pin engaging in the counterbore, and a spring-pressed retracting member carried by the head and extending loosely through the piston.

2. A fluid clutch including, an axial shaft, a hub secured on the shaft, a pressure head surrounding the hub and having teeth engaging thereon, a disk surrounding the hub and having teeth engaging thereon, the pressure head and disk being movable longitudinally of the hub, floating clutch plates having teeth on their outer peripheries, a surrounding member having internal teeth engaged by the clutch plate teeth, the disk being disposed between the clutch plates, the inner peripheries of the plates being spaced radially from the hub, retracting means attached to the head, and releasing elements each including a pin rigidly attached to the head and connected with the disk between the hub and the clutch plates, and limit means on the pin limiting the movement of the disk from the head, said disk being movable on the pin wherein the head and the disk have annular recesses receiving the clutch plates and the releasing pins are disposed between said recesses and the hub.

3. As a sub-combination in a fluid clutch, a piston, a movable pressure head coacting with the piston, and retracting means including, a plunger rigidly attached to the head and extending through the piston, a cylindrical enclosure surrounding the plunger and closed to the atmosphere, said enclosure being carried by the piston and having a pressure fluid inlet from the head and piston, a packing surrounding the plunger at the inlet, a coil spring surrounding the plunger within the enclosure, and packing means carried by the plunger and engaging the inner wall of the enclosure, whereby pressure fluid may be trapped in the enclosure between the inlet packing and the packing means.

GEORGE W. WALTON.

REFERENCES CITED

The following references are of record in the file of this patent:

UNITED STATES PATENTS

| Number | Name | Date |
| --- | --- | --- |
| 1,254,951 | Ward | Jan. 29, 1918 |
| 2,002,367 | Fahrney | May 21, 1935 |
| 2,120,798 | Criley | June 14, 1938 |
| 2,123,867 | Criley | July 19, 1938 |
| 2,282,143 | Carter | May 5, 1942 |
| 2,385,517 | Hunt | Sept. 25, 1945 |
| 2,386,220 | Lawler et al. | Oct. 9, 1945 |
| 2,407,043 | Tremolada | Sept. 3, 1946 |